US012695708B2

(12) United States Patent　　　(10) Patent No.:　US 12,695,708 B2
Baumann et al.　　　　　　　　　　(45) Date of Patent:　　Jul. 28, 2026

(54) METHODS FOR SWITCHING NETWORK PACKETS BASED ON PACKET DATA AND DEVICES THEREOF

(71) Applicant: F5, Inc., Seattle, WA (US)

(72) Inventors: William Baumann, Seattle, WA (US); Alan Mimms, Spokane, WA (US)

(73) Assignee: F5, Inc., Seattle, WA (US)

( * ) Notice: Subject to any disclaimer, the term of this patent is extended or adjusted under 35 U.S.C. 154(b) by 0 days.

(21) Appl. No.: 18/648,784

(22) Filed: Apr. 29, 2024

(65) Prior Publication Data

US 2024/0305580 A1　　Sep. 12, 2024

Related U.S. Application Data

(63) Continuation of application No. 16/588,074, filed on Sep. 30, 2019, now Pat. No. 12,003,422.

(60) Provisional application No. 62/738,590, filed on Sep. 28, 2018.

(51) Int. Cl.
　　H04L 47/41　　　(2022.01)
　　H04L 67/568　　　(2022.01)
　　H04L 69/22　　　(2022.01)
(52) U.S. Cl.
　　CPC ........... H04L 47/41 (2013.01); H04L 67/568 (2022.05); H04L 69/22 (2013.01)
(58) Field of Classification Search
　　CPC ... H04L 45/7453; H04L 47/41; H04L 67/568; H04L 69/22
　　See application file for complete search history.

(56) References Cited

U.S. PATENT DOCUMENTS

| | | | |
|---|---|---|---|
| 3,255,845 | A | 6/1966 | Gardner |
| 8,112,471 | B2 | 2/2012 | Wei |
| 8,458,353 | B2 | 6/2013 | Krishnaswamy |
| 9,172,756 | B2 | 10/2015 | Ramachandran |
| 9,450,880 | B2 * | 9/2016 | Janakiraman ..... H04L 45/74591 |

(Continued)

FOREIGN PATENT DOCUMENTS

| | | |
|---|---|---|
| EP | 3255845 A1 | 12/2017 |
| WO | 2017144123 A1 | 8/2017 |
| WO | 20230117367 A1 | 6/2023 |

OTHER PUBLICATIONS

F5 Networks, Release Notes: BIG-IP 11.5.0 L TM and TMOS Release Notes, available at: https://techdocs.f5.com/kb/n-us/products/big-ip_ltm/releasenotes/producl/relnoteltm-11-5-0.html#rn_new, Mar. 18, 2018.

(Continued)

*Primary Examiner* — Mansour Oveissi

(74) *Attorney, Agent, or Firm* — Troutman Pepper Locke LLP

(57)　　　ABSTRACT

Methods, non-transitory computer readable media, network traffic manager apparatuses, and systems that assist with network packet switching based on packet data includes receiving a plurality of network packets. Next, header data and payload data is separated for each of the plurality of received network packets. Next, digest data is created from the separated header data for each of the plurality of network packets. One or more network actions are identified for each (Continued)

of the plurality of network packets based on the corresponding created digest data. The identified one or more network actions are performed on the separated header data and the payload data.

20 Claims, 5 Drawing Sheets

(56) References Cited

U.S. PATENT DOCUMENTS

| | | | | |
|---|---|---|---|---|
| 9,674,054 | B2 | 6/2017 | Scharf | |
| 10,143,001 | B2 | 11/2018 | Schliwa-Bertling | |
| 10,476,992 | B1 | 11/2019 | Amdahl | |
| 10,554,793 | B2 | 2/2020 | Roeland | |
| 10,757,146 | B2 | 8/2020 | Annamalaisami | |
| 11,302,020 | B2 | 4/2022 | Matsuo | |
| 11,570,239 | B2 | 1/2023 | Desmouceaux | |
| 11,783,087 | B1 | 10/2023 | Agarwal | |
| 12,289,209 | B1 | 4/2025 | Evans | |
| 2002/0143892 | A1 | 10/2002 | Mogul | |
| 2007/0071233 | A1 * | 3/2007 | Zak | H04L 9/0662 |
| | | | | 380/46 |
| 2007/0147258 | A1 | 6/2007 | Mottishaw | |
| 2007/0206620 | A1 | 9/2007 | Cortes | |
| 2009/0180477 | A1 | 7/2009 | Akahane | |
| 2010/0290468 | A1 | 11/2010 | Lynam | |
| 2014/0040451 | A1 | 2/2014 | Agrawal | |
| 2015/0230274 | A1 | 8/2015 | Sharma | |
| 2016/0140045 | A1 | 5/2016 | Bergeron | |
| 2016/0142438 | A1 | 5/2016 | Pastore | |
| 2017/0144123 | A1 | 5/2017 | Tabeling | |
| 2017/0195427 | A1 | 7/2017 | Choquette | |
| 2017/0317920 | A1 | 11/2017 | Rocquelay | |
| 2017/0373953 | A1 | 12/2017 | George | |
| 2018/0041524 | A1 | 2/2018 | Reddy | |
| 2018/0062979 | A1 | 3/2018 | Zee | |
| 2018/0189471 | A1 | 7/2018 | Paluri | |
| 2018/0248714 | A1 | 8/2018 | Milescu | |
| 2019/0068694 | A1 | 2/2019 | Ripke | |
| 2019/0182363 | A1 | 6/2019 | Bonaventure | |
| 2019/0182367 | A1 | 6/2019 | Kim | |
| 2019/0297058 | A1 | 9/2019 | Ragusa | |
| 2019/0372937 | A1 | 12/2019 | Song | |
| 2020/0177592 | A1 | 6/2020 | Idika | |
| 2020/0314615 | A1 | 10/2020 | Patil | |
| 2020/0396267 | A1 | 12/2020 | Petria | |
| 2021/0022041 | A1 | 1/2021 | Allan | |
| 2021/0204200 | A1 | 7/2021 | Krishan | |
| 2022/0060547 | A1 | 2/2022 | Krishan | |
| 2022/0070648 | A1 | 3/2022 | Krishan | |
| 2022/0200851 | A1 | 6/2022 | Smith | |
| 2023/0110131 | A1 | 4/2023 | Smith | |
| 2024/0114012 | A1 | 4/2024 | Venkatesan | |

OTHER PUBLICATIONS

Ford et al., Request for Comments: 6824, TCP Extensions for Multipath Operation with Multiple Addresses, available at: https://tools.ielf.org/pdf/rfc6824. pdf, Jan. 2013.

Scharf et al., Request for Comments: 6897, Multipath TCP (MPTCP) Application Interface Considerations, available at: https://www.rfc-editor.org/rfc/pdfrfc/rfc6897. lxt. pdf, Mar. 2013.

Extended European Search Report, dated Mar. 25, 2022.

F5—Simplify and Secure 5G Core Signaling https://www. f5. co mi prod u cts/big-i p-se 1vlces/service-co mmu n Ication-proxy downloaded Sep. 27, 2023.

F5—Secure 5G Roaming and Network Interconnection https://www. f5. com/ prod u cts/big-i p-se 1vices/secu rity-edge-protectio n-proxy downloaded Sep. 27, 2023.

Oracle Communications—Cloud Native Core; Licensing Information user Manual; Release 2.0.0; F22873-01 (Sep. 2019) https://docs.oracle .com/cd/F22976. _ 01 /docs. 10 /L.icensin~i% 20Manual .pdf downloaded Sep. 29, 2023.

Cisco—Ultra Cloud Core 5G Session Management Function, Release Jan. 2021—Configuration and Administration Guide—Wreless Priority Guide https :l /www.cisco.com/c/en/us/td/docs/wi reiesstucc/ smf/2021-01-0/SMF Config_Admi n/b ucc-5g-smf-config-and-admin-guide. _ 2021-01 im __ wireless-priority-services. html Updated Feb. 12, 2021; downloaded Sep. 27, 2023.

M. Tllomson, et al.; internet Engineering Task Force (IETF); RFC 91•13—HTTP/2, section 5.3 https://datatracker.ietLorg/docihtml/ rfc9113#section-5.3 Published Jun. 2022 (ISSN: 2070-1721) downloaded Sep. 27, 2023.

ETSI TS 128 500 V17.8.0 (Oct. 2022) Technical Specification; 5G System; Tec:tmical Realization of Sew1vice Based Architecture: Stage 3 (3GPP TS29.500 version 17.8.0 Release 17) https :l /portal .etsi .orgtweba pp/workprog rn m/Report_WorkItem. asp\I\IK I_I 0=67084 downloaded Sep. 29, 2023.

European Search Report Dated Feb. 27, 2025. European Application No. EP 24 20 2428.9.

European Search Report dated Sep. 18, 2024. European Application No. 24173105.8.

European Search Report for EP Application No. 24193940.4, dated Oct. 30, 2024.

Tripathi et al., "Protected resource access for mobile agent-based distributed computing," Proceedings of the 1998 ICPP Workshop on Architectural and OS Support for Multimedia Applications Flexible Communication Systems. Wireless Networks and Mobile Computing (Cat. No. 98EX206)Year: 1998 | Conference Paper | Publ.

Inagaki et al., "Shared-Resource Management Using Online Social-Relationship Metric for Altruistic Device Sharing," IEEE Access Year: 2018 | vol. 6 | Journal Article | Publisher: IEEE.

* cited by examiner

Receive network packets 305

Separate the header and payload data 310

Cache the payload 315

Create a digest 320

Send the digest to the dedicated processor 325

Scan the digest to identify information 330

Identify the actions to be taken based on the contents of the hash value 335

Perform the determined actions on the header and payload information 340

END 345

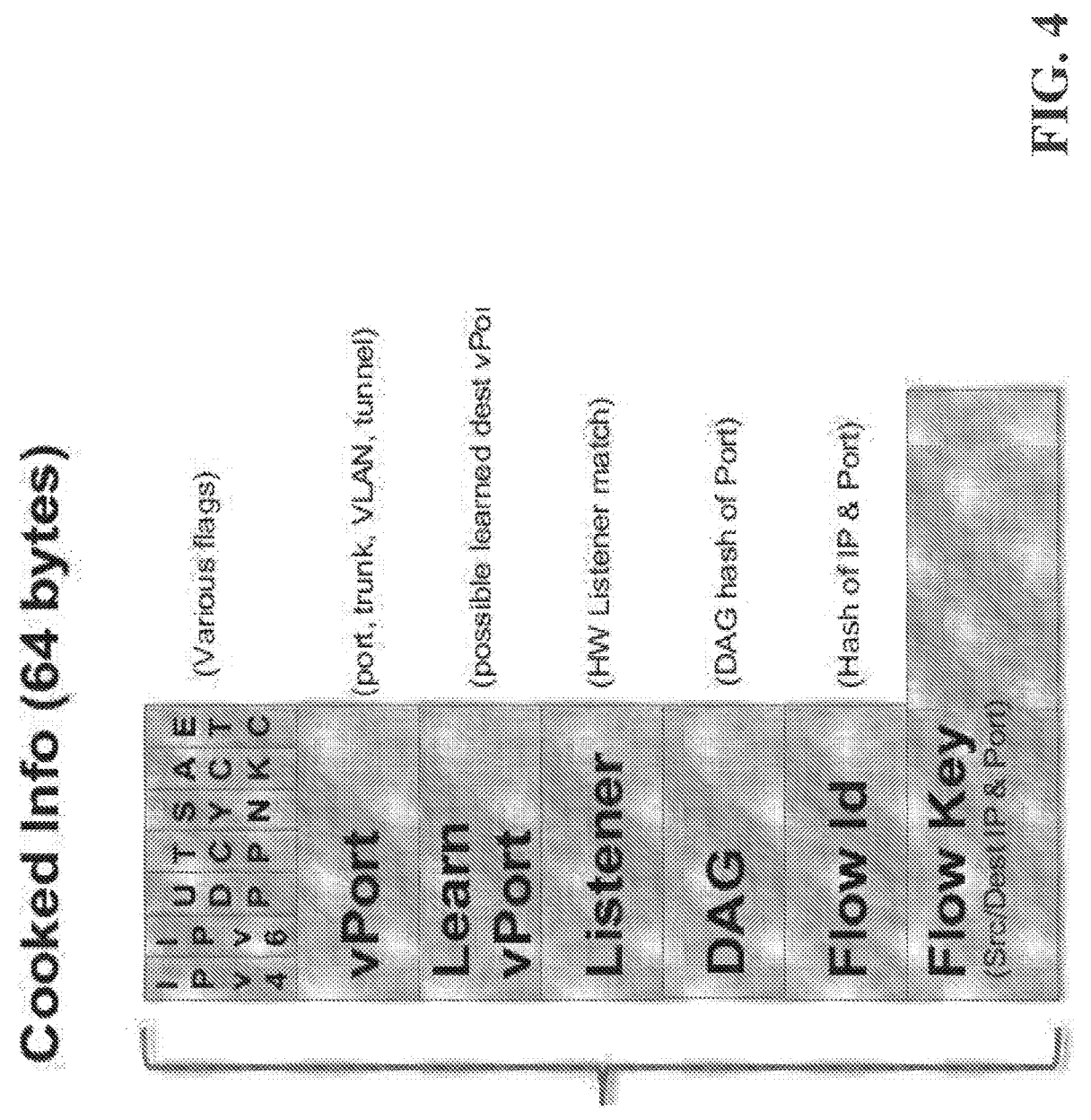

Cooked Info (64 bytes)

| | |
|---|---|
| L I U T S A E<br>P P b c v c T<br>v v P P N K c<br>4 6 P N K c | (Various flags) |
| vPort | (port, trunk, VLAN, tunnel) |
| Learn vPort | (possible learned dest vPort) |
| Listener | (HW Listener match) |
| DAG | (DAG hash of Port) |
| Flow Id | (Hash of IP & Port) |
| Flow Key<br>(Src Dest IP & Port) | |

FIG. 4

METHODS FOR SWITCHING NETWORK PACKETS BASED ON PACKET DATA AND DEVICES THEREOF

CROSS REFERENCE TO RELATED APPLICATIONS

This application is a continuation application of U.S. patent application Ser. No. 16/588,074, filed Sep. 30, 2019, which claims the benefit of U.S. Provisional Patent Application Ser. No. 62/738,590, filed Sep. 28, 2018, the benefit of which is hereby claimed under 35 U.S.C. §§ 119(e) and 120, and which are each further incorporated by reference in their entirety.

FIELD

This technology generally relates to methods and devices for network traffic management and, more particularly, to methods for switching network packets based on packet data and devices thereof.

BACKGROUND

Computer networks may often experience a high volume of network traffic from across a variety of network devices and from a variety of user devices. The high volume of network traffic also translates to high volume of network packets flowing across computer networks.

In order to process these high volume network packets, prior technologies have required a processor or multiple processors within a proxy device to receive the network packets, scan the network packets, and take necessary network actions, such as routing the packets or dropping the packets, based on the scan. In particular, with respect to scanning the network packets so that the necessary action can be taken, prior technologies have required a processor within the network proxy device to identify tags in the packets that represent the client or the type of the service requested. The identified tags are then translated by the processor into necessary network actions. Unfortunately, the implementation of this process has required a large collection of hardware devices which is costly and technologically difficult to effectively manage.

SUMMARY

A method for managing network packets includes separating header data and payload data from each of a plurality of received network packets. Next, digest data is created from the separated header data for each of the plurality of network packets. One or more network actions are identified for each of the plurality of network packets based on the corresponding created digest data. The identified one or more network actions are performed on the separated header data and the payload data.

A non-transitory computer readable medium having stored thereon instructions for managing network packets comprising machine executable code which when executed by at least one processor, causes the processor to separate header data and payload data from each of a plurality of received network packets. Next, digest data is created from the separated header data for each of the plurality of network packets. One or more network actions are identified for each of the plurality of network packets based on the corresponding created digest data. The identified one or more network actions are performed on the separated header data and the payload data.

A network traffic management apparatus including at least one of configurable hardware logic configured to be capable of implementing or a processor coupled to a memory and configured to execute programmed instructions stored in the memory to separate header data and payload data from each of a plurality of received network packets. Next, digest data is created from the separated header data for each of the plurality of network packets. One or more network actions are identified for each of the plurality of network packets based on the corresponding created digest data. The identified one or more network actions are performed on the separated header data and the payload data.

A network traffic management system, comprising one or more traffic management apparatuses, client devices, or server devices, the network traffic management system comprising memory comprising programmed instructions stored thereon and one or more processors configured to be capable of executing the stored programmed instructions to separate header data and payload data from each of a plurality of received network packets. Next, digest data is created from the separated header data for each of the plurality of network packets. One or more network actions are identified for each of the plurality of network packets based on the corresponding created digest data. The identified one or more network actions are performed on the separated header data and the payload data.

This technology provides a number of advantages including providing methods, non-transitory computer readable media, apparatuses, and systems that assist with service switching network packets based on packet data. By using the technique illustrated above, examples of the disclosed technology are able to process a higher number of received packets with a field programmable gate array (FPGA) configured to create the digest data from the network packets and then a processor is able to execute programmed instruction to perform one or more network actions based on the created digest data. Accordingly, network actions, such as routing, load balancing, policing, encrypting, and decrypting by way of example, are performed much more efficiently by dividing the decision making process between the FPGA and the processor. By dividing the processing between the FPGA and the processor, the disclosed technology is able efficiently utilize the operation of fast low level logic (such as a FPGA) and slower higher intelligence device (such as a processor) to manage network traffic effectively.

BRIEF DESCRIPTION OF THE DRAWINGS

FIG. 4 is an exemplary image of the digest data created from the header of the packet.

DETAILED DESCRIPTION

Figure 1:
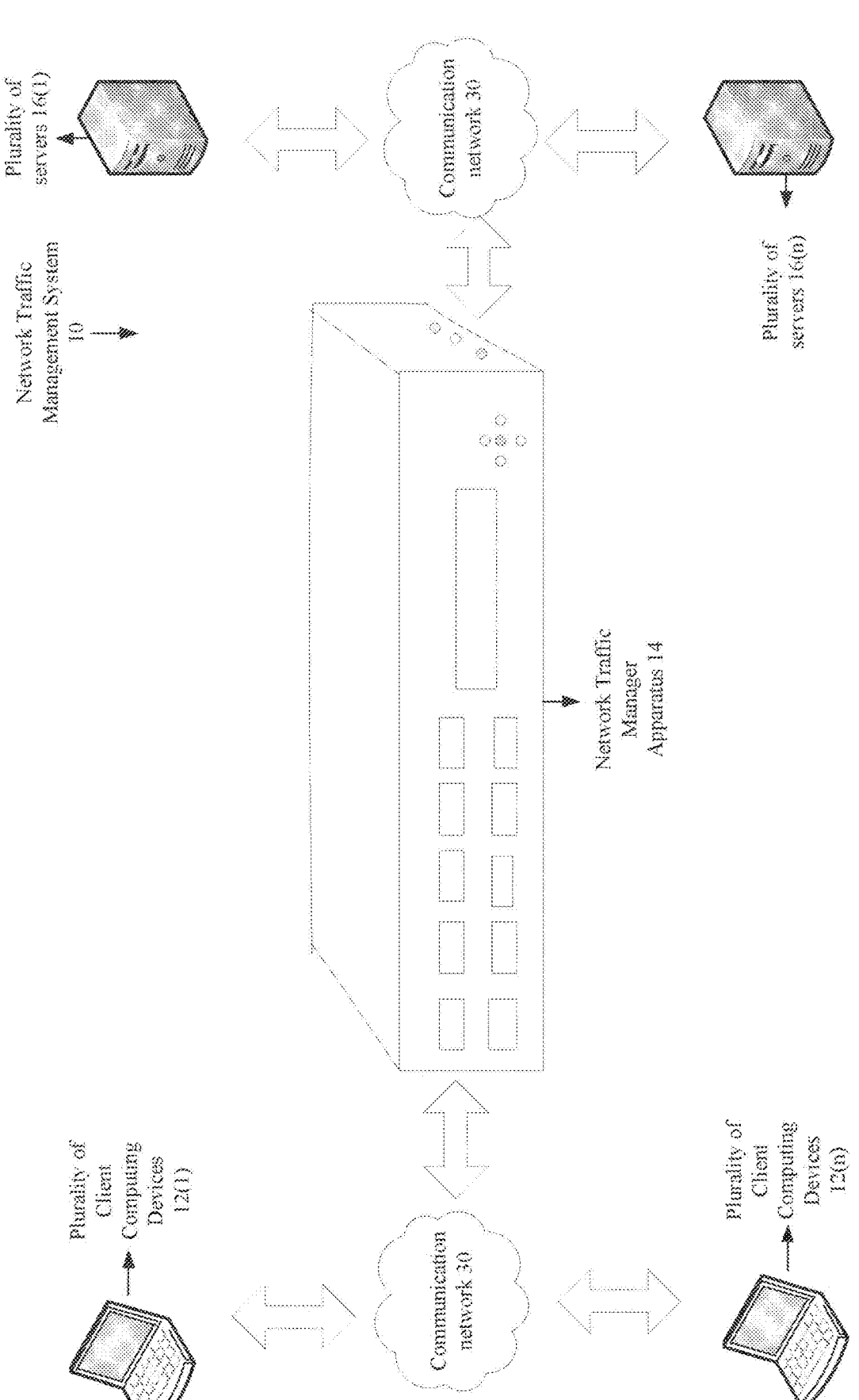
FIG. 1 is an example of a block diagram of a network traffic management system including a network traffic management apparatus for switching network packets based on packet data.
Figure 2:
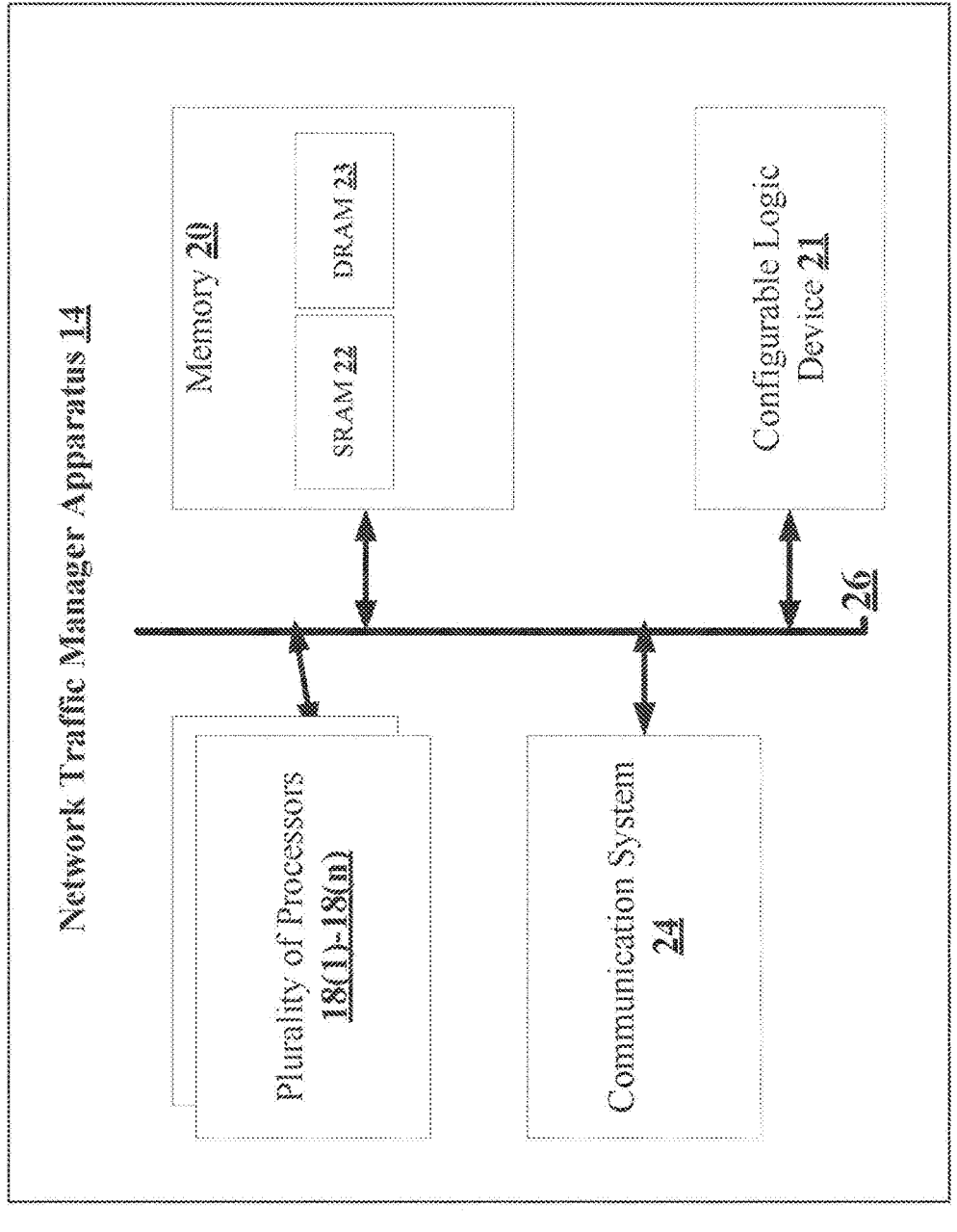
FIG. 2 is an example of a block diagram of a network traffic management apparatus.

An example of a network environment 10 which incorporates a network traffic management system for switching network packets based on packet data with the network traffic manager apparatus 14 is illustrated in FIGS. 1 and 2. The exemplary environment 10 includes a plurality of client computing devices 12(1)-12(n), a network traffic manager apparatus 14, and a plurality of servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including switching network packets based on packet data.

Referring more specifically to FIGS. 1 and 2, the network traffic manager apparatus 14 of the network traffic management system is coupled to the plurality of client computing devices 12(1)-12(n) through the communication network 30, although the plurality of client computing devices 12(1)-12(n) and network traffic manager apparatus 14 may be coupled together via other topologies. Additionally, the network traffic manager apparatus 14 is coupled to the plurality of servers 16(1)-16(n) through the communication network 30, although the servers 16(1)-16(n) and the network traffic manager apparatus 14 may be coupled together via other topologies.

The network traffic manager apparatus 14 assists with switching network packets based on packet data as illustrated and described by way of the examples herein, although the network traffic manager apparatus 14 may perform other types and/or numbers of functions. As illustrated in FIG. 2, the network traffic manager apparatus 14 includes a plurality of processors 18(1)-18(n) or central processing unit (CPU) 18, memory 20, optional configurable hardware logic 21, and a communication system 24 which are coupled together by a bus device 26 although the network traffic manager apparatus 14 may comprise other types and numbers of elements in other configurations. In this example, the bus 26 is a PCI Express bus in this example, although other bus types and links may be used.

The plurality of processors 18(1)-18(n) within the network traffic manager apparatus 14 may execute one or more computer-executable instructions stored in memory 20 for the methods illustrated and described with reference to the examples herein, although the processor can execute other types and numbers of instructions and perform other types and numbers of operations. The plurality of processors 18(1)-18(n) may comprise one or more central processing units ("CPUs") or general purpose processors with one or more processing cores, such as AMD® processor(s), although other types of processor(s) could be used (e.g., Intel®).

Figure 3:
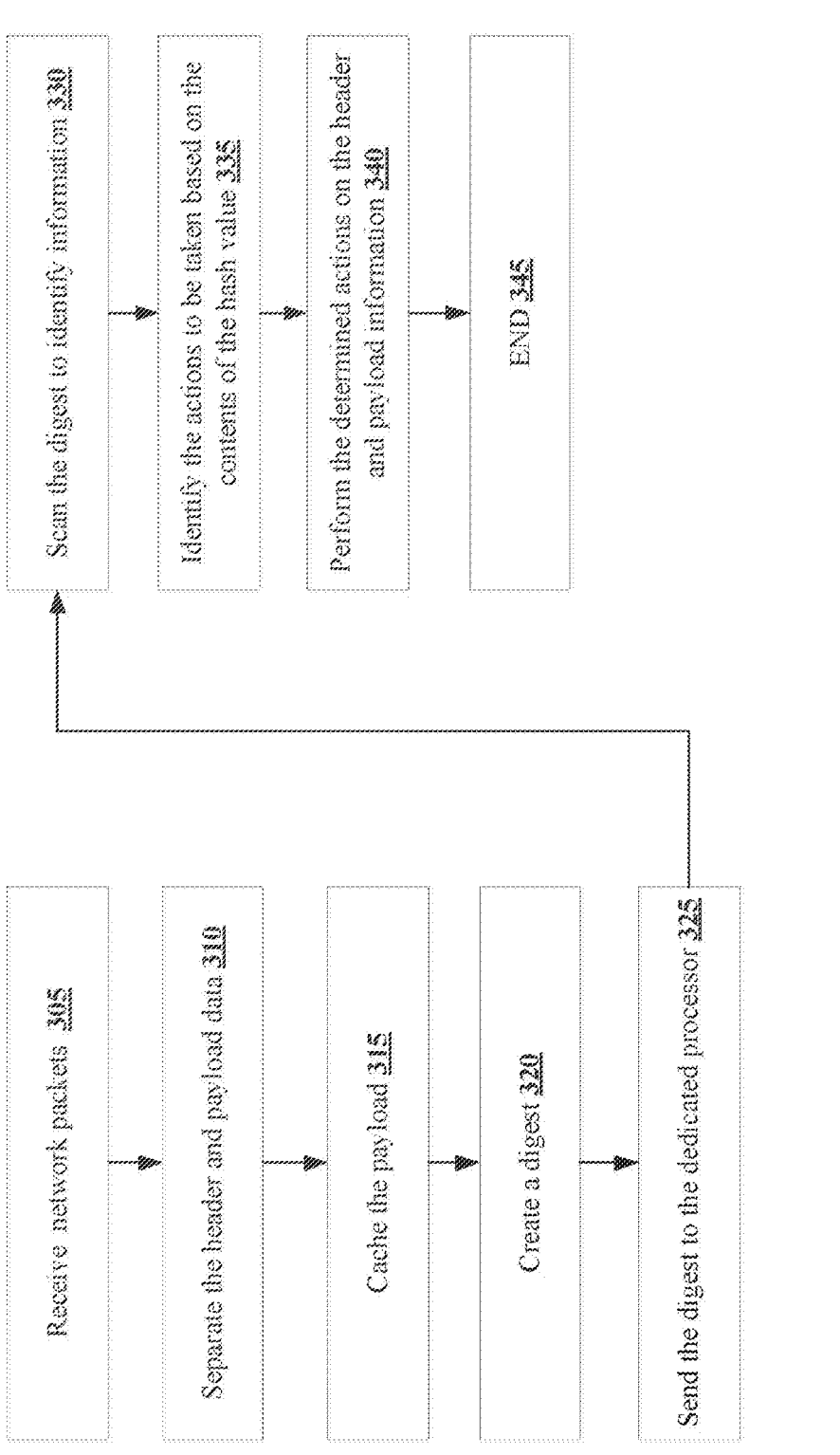
FIG. 3 is an exemplary flowchart of a method for switching network packets based on packet data.

The memory 20 within the network traffic manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the plurality of processors 18(1)-18(n). The exemplary flowchart shown in FIG. 3 is representative of example steps or actions of this technology that may be embodied or expressed as one or more non-transitory computer or machine readable instructions stored in the memory 20 that may be executed by the processor 18 and/or may be implemented by configured logic in the optional configurable logic 21.

Figure 5:
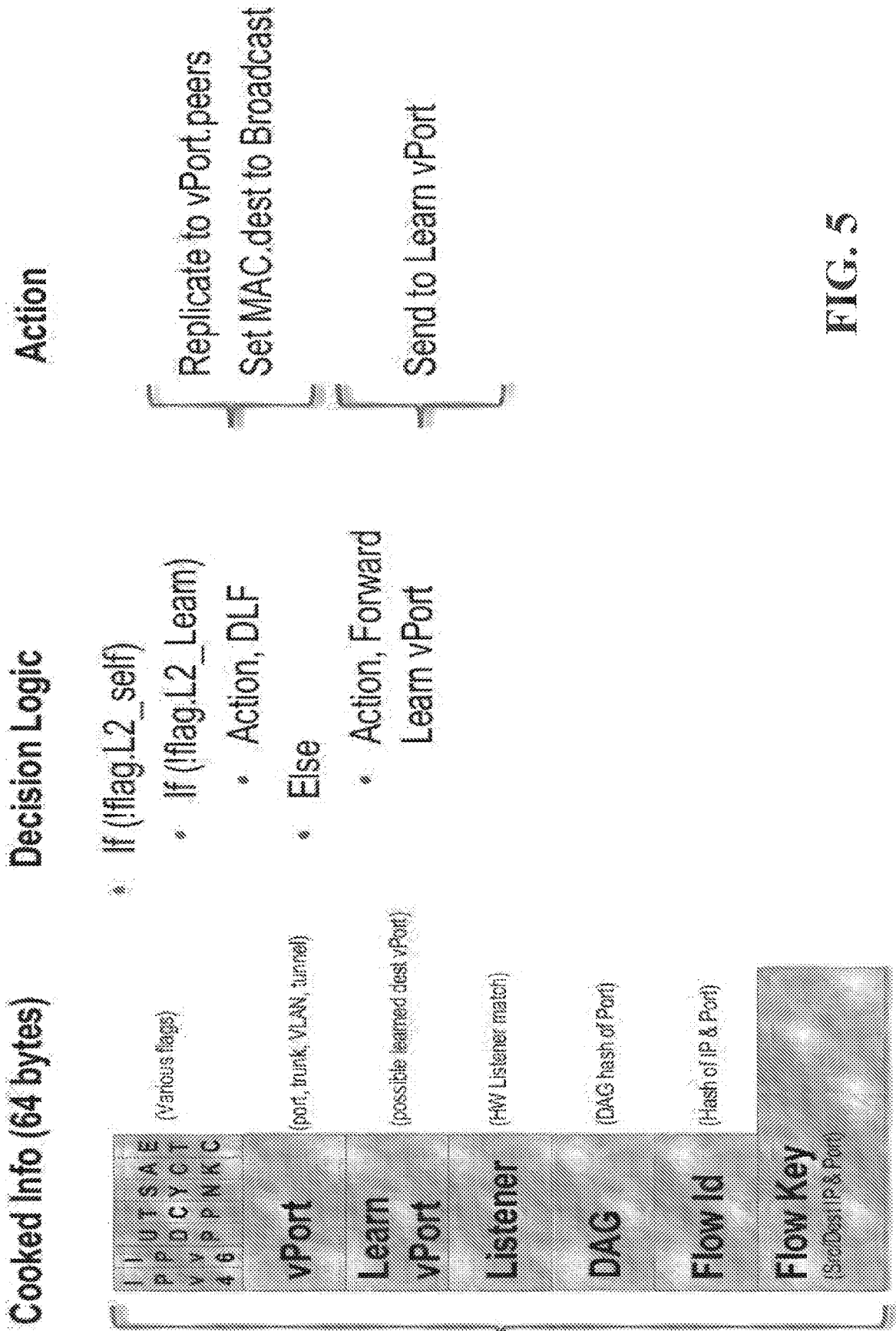
FIG. 5 is an exemplary image of a network action derived from the digest data.

Accordingly, the memory 20 of the network traffic manager apparatus 14 can store one or more applications that can include computer executable instructions that, when executed by the network traffic manager apparatus 14, causes the network traffic manager apparatus 14 to perform actions, such as to transmit, receive, or otherwise process messages, for example, and to perform other actions described and illustrated below with reference to FIGS. 3-5. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic manager apparatus 14 itself, may be located in virtual server(s) running in a cloud-based computing environment rather than being tied to one or more specific physical network computing devices. Also, the application(s) may be running in one or more virtual machines (VMs) executing on the network traffic manager apparatus 14. Additionally, in at least one of the various embodiments, virtual machine(s) running on the network traffic manager apparatus 14 may be managed or supervised by a hypervisor.

The optional configurable hardware logic device 21 in the network traffic manager apparatus 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits (ASICs") and/or programmable logic units ("PLUS").

The communication system 24 in the network traffic manager apparatus 14 is used to operatively couple and communicate between the network traffic manager apparatus 14, the plurality of client computing devices 12(1)-12(n), and the plurality of servers 16(1)-16(n) which are all coupled together by communication network 30 such as one or more local area networks (LAN) and/or the wide area network (WAN), although other types and numbers of communication networks or systems with other types and numbers of connections and configurations to other devices and elements may be used. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a PCI Express bus in this example, although other bus types and links may be used.

Each of the plurality of client computing devices 12(1)-12(n) of the network traffic management system 10, include a central processing unit (CPU) or processor, a memory, input/display device interface, configurable logic device and an input/output system or I/O system, which are coupled together by a bus or other link. The plurality of client computing devices 12(1)-12(n), in this example, may run interface applications, such as Web browsers, that may provide an interface to make requests for and send and/or receive data to and/or from the web application servers 16(1)-16(n) via the network traffic manager apparatus 14. Additionally, the plurality of client computing devices 12(1)-12(n) can include any type of computing device that can receive, render, and facilitate user interaction, such as client computers, network computer, mobile computers, mobile phones, virtual machines (including cloud-based computer), or the like. Each of the plurality of client computing devices 12(1)-12(n) utilizes the network traffic manager apparatus 14 to conduct one or more operations with the web application servers 16(1)-16(n), such as to obtain data and/or access the applications from one of the web application servers 16(1)-16(n), by way of example only, although other numbers and/or types of systems could be utilizing these resources and other types and numbers of functions utilizing other types of protocols could be performed.

Each of the plurality of servers 16(1)-16(n) of the network traffic management system include a central processing unit (CPU) or processor, a memory, and a communication system, which are coupled together by a bus or other link, although other numbers and/or types of network devices could be used. Generally, the plurality of servers 16(1)-16(n) process requests for providing access to one or more enterprise web applications received from the plurality of client computing devices 12(1)-12(n), network traffic manager apparatus 14, via the communication network 30 according to the HTTP-based application RFC protocol or the CIFS or NFS protocol in this example, but the principles discussed herein are not limited to this example and can include other application protocols. A series of applications may run on the plurality web application servers 16(1)-16(n) that allows the transmission of applications requested by the plurality of client computing devices 12(1)-12(n), or the network traffic manager apparatus 14. The plurality of servers 16(1)-16(n) may provide data or receive data in response to requests directed toward the respective applications on the plurality of servers 16(1)-16(n) from the plurality of client computing devices 12(1)-12(n) or the network traffic manager apparatus 14. It is to be understood that the plurality of servers 16(1)-16(n) may be hardware or software or may represent a system with multiple external resource servers, which may include internal or external networks. In this example the plurality of servers 16(1)-16(n) may be any version of Microsoft® IIS servers or Apache® servers, although other types of servers may be used.

Although the plurality of servers 16(1)-16(n) are illustrated as single servers, one or more actions of the plurality of servers 16(1)-16(n) may be distributed across one or more distinct network computing devices. Moreover, the plurality of servers 16(1)-16(n) are not limited to a particular configuration. Thus, the plurality of plurality web application servers 16(1)-16(n) may contain a plurality of network computing devices that operate using a master/slave approach, whereby one of the network computing devices of the plurality of servers 16(1)-16(n) operate to manage and/or otherwise coordinate operations of the other network computing devices. The plurality of servers 16(1)-16(n) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, the one or more of the plurality of servers 16(1)-

16(n) depicted in FIG. 1 can operate within network traffic manager apparatus 14 rather than as a stand-alone server communicating with network traffic manager apparatus 14 via the communication network(s) 30. In this example the plurality of servers 16(1)-16(n) operate within the memory 20 of the network traffic manager apparatus 14.

While the network traffic manager apparatus 14 is illustrated in this example as including a single device, the network traffic manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic manager apparatus 14 in other examples can be standalone devices or integrated with one or more other devices or applications, such as one of the plurality of servers 16(1)-16(n) or, the network traffic manager apparatus 14, or applications coupled to the communication network(s), for example. Moreover, one or more of the devices of the network traffic manager apparatus 14 in these examples can be in a same or a different communication network 30 including one or more public, private, or cloud networks, for example.

Although an exemplary network traffic management system 10 with the plurality of client computing devices 12(1)-12(n), the network traffic manager apparatus 14, and the plurality of servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system, such as the network traffic manager apparatus 14, the plurality of client computing devices 12(1)-12(n), the plurality of servers 16(1)-16(n), for example, may be configured to operate as virtual instances on the same physical machine. In other words, one or more of network traffic manager apparatus 14, the IDP server 13, the plurality of client computing devices 12(1)-12(n), or the plurality of servers 16(1)-16(n) illustrated in FIG. 1 may operate on the same physical device rather than as separate devices communicating through a network as depicted in FIG. 1. There may be more or fewer plurality of client computing devices 12(1)-12(n), network traffic manager apparatus 14, or the plurality of servers 16(1)-16(n) than depicted in FIG. 1. The plurality of client computing devices 12(1)-12(n), the plurality of servers 16(1)-16(n) could be implemented as applications on network traffic manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for packet switching based on packet data will now be described with reference to FIGS. 1-5. First in step 305, the network traffic manager apparatus 14 receives a plurality of network packets from one of the plurality of client computing devices 12(1)-12(n), although the network traffic manager apparatus 14 can receive the network packets from other devices.

In step 310, the network traffic manager apparatus 14 separates the header data and the payload data in each of the plurality of received network packets, although the network traffic manager apparatus 14 may separate in other manners in other examples. In this example, the network traffic manager apparatus 14 separates the payload data from the header data and forwards the header data for further processing as will be further explained below. By processing only the header data, the technology disclosed will be able to process the network packets at a higher rate because the header data is smaller in size when compared to the payload data.

In step 315, the network traffic manager apparatus 14 caches the payload data within memory 20, although the network traffic manager apparatus 14 can cache or otherwise store the payload data in other manners and/or at other memory locations. In this example, the network traffic manager apparatus 14 caches the payload data into the SRAM 22 or DRAM 23 within the memory 20 as illustrated in FIG. 2. Alternatively in another example, the network traffic manager apparatus 14 can cache the header data along with the payload data in other examples.

In step 320, the network traffic manager apparatus 14 creates a digest data from the header data of the received network packet, although the network traffic manager apparatus 14 can create the digest based on other parameters. In this example and as illustrated in FIG. 4, the FPGA within the network traffic manager apparatus 14 creates a digest including the length of the packet, data associated with the validity of the packet or the length of the packet, the type of the received network packet, port data, trunk data, VLAN data, tunnel data, listener match data, destination port data, dis-aggregator hash port data, hash of the IP and the port address, and the flow key associated with the source/destination IP and port address, although the digest can include other types and/or amounts of information associated with the header data. In this example, the digest of the header data for each of the network packet is entered into a contiguous ring (data structure) where the digest is processed in the order that it arrives into the contiguous ring. Alternatively, in another example, the network traffic manager apparatus 14 can create multiple digests from one header data.

In step 325, the network traffic manager apparatus 14 assigns the digest data for each of the header data to a dedicated processor of the plurality of processors 18(1)-18(n) within the network traffic manager apparatus 14, although the network traffic manager apparatus 14 can assign all the digest data to a shared processor in other examples. In this example, the network traffic manager apparatus 14 selects the dedicated processor from the plurality of processors 18(1)-18(n) based on the contents of the digest data, although the dedicated processor from the plurality of processors 18(1)-18(n) can be selected based on other techniques or parameters such as the received network packets, types of network connections and/or sessions. By assigning the digest data to the dedicated processor, the disclosed technology is able to leave the static decisions, such as creating the digest data to the FPGA, within the network traffic manager apparatus 14 and forward the dynamic decisions to the processor.

Next in step 330, the assigned processor within the network traffic manager apparatus 14 scans the received digest data for a hash value, although the assigned processor within the network traffic manager apparatus 14 can scan the received digest data for other types or amounts of information. In this example, the hash value can be used as an optimization to find information in a secondary or local memory lookup and could be passed with the digest data.

In step 335, the assigned processor within the network traffic manager apparatus 14 identifies the one or more actions to be taken based on the hash value, although the assigned processor within can identify the actions based on many other fields. In this example, the hash value directs the assigned processor within the network traffic manager apparatus 14 to a flow table which includes the one or more actions associated with the hash value or added information (received with the digest data) used to determine the actions. By way of example, as illustrated in FIG. 5, the one or more actions associated with the hash value can include: adding; changing; or deleing one or more MAC or IP addresses from the packet; switching the packet to a new destination; routing the packet to a new next-hop; decrementing the packet's time-to-live; dropping a packet; and/or transforming the header information or the tunnel header information, although other types and/or numbers of actions could be taken based on the requesting client device and/or the type of the packet.

In step 340, the assigned processor within the network traffic manager apparatus 14 performs the identified one or more actions on the header and the payload and the exemplary method ends at step 345. By way of example, FIG. 5 illustrates the processor scanning the digest data to identify the hash value, determining one or more actions from the decision logic, and performing the one or more actions on the payload data and the header data of the received network packets.

Accordingly, as illustrated and described by way of the examples herein, this technology provides a number of advantages including providing methods, non-transitory computer readable media, devices, and system for network packet switching based on the packet data. By using the technique illustrated above, the disclosed technology is able to process a higher number of received packets by configuring the FPGA to create the digest data from the network packets and by utilizing a processor to perform the one or more network actions based on the created digest data.

Accordingly, network actions, such as routing, load balancing, policing, encrypting, or decrypting by way of example, are performed much more efficiently by dividing the processing between the FPGA and the processor. By dividing the processing between the FPGA and the processor, the disclosed technology is able efficiently utilize the operation of fast low level logic (such as a FPGA) and slower higher intelligence device (such as a processor) to manage network traffic effectively.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for managing network packets, the method implemented by a network traffic management system comprising one or more network traffic apparatuses, client devices, or server devices, the method comprising:

creating, exclusively with a field programmable gate array (FPGA) device within a network traffic manager apparatus, digest data from header data of a network packet;

assigning the digest data for the header data to a specific processor of a plurality of processors based on contents of the digest data, wherein the specific processor is a separate processor from the FPGA device;

identifying, using a flow table comprising one or more actions associated with hash values, a network action for the network packet based on the created digest data for the header data; and performing, exclusively with the assigned separate specific processor of the plurality of processors, the identified network action on the header data, wherein the specific processor is selected based on the created digest data for the header data.

2. The method as set forth in claim 1 further comprising:

scanning the created digest data for a hash value; and passing the identified hash value to the assigned separate specific processor to identify the network action based on the identified hash value.

3. The method as set forth in claim 2 wherein the network action is identified based on the identified hash value by directing the assigned separate specific processor of the plurality of processors to a flow table with network actions associated with hash values.

4. The method as set forth in claim 1 wherein the identified network action comprises:

adding, changing or deleting a MAC address from the network packet;

adding, changing or deleting an IP address from the network packet;

switching the network packet to a new destination;

routing the network packet to a next-hop;

decrementing the network packet's time-to-live;

dropping the network packet; or transforming the header data or tunnel data of the network packet.

5. The method as set forth in claim 1 further comprising:

separating payload data from the network packet; and performing, exclusively with the assigned separate specific processor of the plurality of processors, the identified network action on the payload data.

6. A non-transitory computer readable medium having stored thereon instructions for managing network packets comprising executable code which when executed by one or more processors, causes the processors to:

create, exclusively with a field programmable gate array (FPGA) device within a network traffic manager apparatus, digest data from header data of a network packet;

assign the digest data for the header data to a specific processor of a plurality of processors based on contents of the digest data, wherein the specific processor is a separate processor from the FPGA device;

identify, using a flow table comprising one or more actions associated with hash values, a network action for the network packet based on the created digest data for the header data; and perform, exclusively with the assigned separate specific processor of the plurality of processors, the identified network action on the header data, wherein the specific processor is selected based on the created digest data for the header data.

7. The medium as set forth in claim 6, wherein the one or more processors are further configured to be capable of executing the programmed instructions stored in the memory to:

scan the created digest data for a hash value; and pass the identified hash value to the assigned separate specific processor to identify the network action based on the identified hash value.

8. The medium as set forth in claim 7, wherein the network action is identified based on the identified hash value by directing the assigned separate specific processor of the plurality of processors to a flow table with network actions associated with hash values.

9. The medium as set forth in claim 6, wherein the one or more processors are further configured to be capable of executing the programmed instructions stored in the memory to:

add, change or delete a MAC address from the network packet;

add, change or delete an IP address from the network packet;

switch the network packet to a new destination;

route the network packet to a next-hop;

decrement the network packet's time-to-live;

drop the network packet; or transform the header data or tunnel data of the network packet.

10. The medium as set forth in claim 6, wherein the one or more processors are further configured to be capable of executing the programmed instructions stored in the memory to:

separate payload data from the network packet; and perform, exclusively with the assigned separate specific processor of the plurality of processors, the identified network action on the payload data.

11. A network traffic manager apparatus, comprising memory comprising programmed instructions stored in the memory and one or more processors configured to be capable of executing the programmed instructions stored in the memory to:

create, exclusively with a field programmable gate array (FPGA) device within a network traffic manager apparatus, digest data from header data of a network packet;

assign the digest data for the header data to a specific processor of a plurality of processors based on contents of the digest data, wherein the specific processor is a separate processor from the FPGA device;

identify, using a flow table comprising one or more actions associated with hash values, a network action for the network packet based on the created digest data for the header data; and perform, exclusively with the assigned separate specific processor of the plurality of processors, the identified network action on the header data, wherein the specific processor is selected based on the created digest data for the header data.

12. The apparatus as set forth in claim 11, wherein the one or more processors are further configured to be capable of executing the programmed instructions stored in the memory to:

scan the created digest data for a hash value; and pass the identified hash value to the assigned separate specific processor to identify the network action based on the identified hash value.

13. The apparatus as set forth in claim 12, wherein the network action is identified based on the identified hash value by directing the assigned separate specific processor of the plurality of processors to a flow table with network actions associated with hash values.

14. The apparatus as set forth in claim 11, wherein the one or more processors are further configured to be capable of executing the programmed instructions stored in the memory to:

add, change or delete a MAC address from the network packet;

add, change or delete an IP address from the network packet;

switch the network packet to a new destination;

route the network packet to a next-hop;

decrement the network packet's time-to-live;

drop the network packet; or transform the header data or tunnel data of the network packet.

15. The apparatus as set forth in claim 11, wherein the one or more processors are further configured to be capable of executing the programmed instructions stored in the memory to:

separate payload data from the network packet; and perform, exclusively with the assigned separate specific processor of the plurality of processors, the identified network action on the payload data.

16. A network traffic management system, comprising one or more traffic management apparatuses, client devices, or server devices, the network traffic management system comprising memory comprising programmed instructions stored thereon and one or more processors configured to be capable of executing the stored programmed instructions to:

create, exclusively with a field programmable gate array (FPGA) device within a network traffic manager apparatus, digest data from header data of a network packet;

assign the digest data for the header data to a specific processor of a plurality of processors based on contents of the digest data, wherein the specific processor is a separate processor from the FPGA device;

identify, using a flow table comprising one or more actions associated with hash values, a network action for the network packet based on the created digest data for the header data; and perform, exclusively with the assigned separate specific processor of the plurality of processors, the identified network action on the header data, wherein the specific processor is selected based on the created digest data for the header data.

17. The network traffic management system of claim 16, wherein the one or more processors are further configured to be capable of executing the programmed instructions stored in the memory to:

scan the created digest data for a hash value; and pass the identified hash value to the assigned separate specific processor to identify the network action based on the identified hash value.

18. The network traffic management system of claim 17, wherein the network action is identified based on the identified hash value by directing the assigned separate specific processor of the plurality of processors to a flow table with network actions associated with hash values.

19. The network traffic management system of claim 16, wherein the one or more processors are further configured to be capable of executing the programmed instructions stored in the memory to:

add, change or delete a MAC address from the network packet;

add, change or delete an IP address from the network packet;

switch the network packet to a new destination;

route the network packet to a next-hop;

decrement the network packet's time-to-live;

drop the network packet; or transform the header data or tunnel data of the network packet.

20. The network traffic management system of claim 16, wherein the one or more processors are further configured to be capable of executing the programmed instructions stored in the memory to:

separate payload data from the network packet; and perform, exclusively with the assigned separate specific processor of the plurality of processors, the identified network action on the payload data.

* * * * *